United States Patent
Wood et al.

(10) Patent No.: US 9,311,221 B2
(45) Date of Patent: Apr. 12, 2016

(54) RECORDING PROGRAM EXECUTION

(71) Applicant: Ab Initio Technology LLC, Lexington, MA (US)

(72) Inventors: Joseph Stuart Wood, Andover, MA (US); Robert Freundlich, Sudbury, MA (US)

(73) Assignee: Ab Initio Technology LLC

( * ) Notice: Subject to any disclaimer, the term of this patent is extended or adjusted under 35 U.S.C. 154(b) by 0 days.

(21) Appl. No.: 14/156,905

(22) Filed: Jan. 16, 2014

(65) Prior Publication Data

US 2014/0282418 A1    Sep. 18, 2014

Related U.S. Application Data

(60) Provisional application No. 61/798,246, filed on Mar. 15, 2013.

(51) Int. Cl.
| | | |
|---|---|---|
| G06F 9/44 | (2006.01) | |
| G06F 11/00 | (2006.01) | |
| G06F 3/048 | (2013.01) | |
| G06F 11/36 | (2006.01) | |

(Continued)

(52) U.S. Cl.
CPC ........ G06F 11/3636 (2013.01); G06F 9/45508 (2013.01); G06F 11/323 (2013.01); G06F 11/362 (2013.01); G06F 11/366 (2013.01); G06F 8/34 (2013.01); G06F 11/3495 (2013.01)

(58) Field of Classification Search
CPC ............ G06F 11/3495; G06F 11/3476; G06F 11/3664; G06F 11/3636; G06F 11/3608; G06F 11/3612; G06F 9/30; G06F 9/465; G06F 9/5066; G06F 8/34; G06F 8/20; G06F 9/45508; G06F 9/542; G06F 9/4411; G06F 11/323; G06F 11/362; G06F 11/3656; G06F 11/3409

See application file for complete search history.

(56) References Cited

U.S. PATENT DOCUMENTS 4,991,176 A    2/1991    Dahbura et al.
5,168,554 A *  12/1992   Luke ................... G06F 11/323
                                                       715/963

(Continued)

OTHER PUBLICATIONS

Thomas Wurthinger, Visualization of Program Dependence Graphs, Aug. 2007, [Retrieved on Nov. 20, 2015]. Retrieved from the internet: <URL: http://www.ssw.uni-linz.ac.at/Research/Papers/Wuerthinger07Master/Wuerthinger07Master.pdf> 86 Pages (1-86).*

(Continued)

*Primary Examiner* — Thuy Dao
*Assistant Examiner* — Anibal Rivera
(74) *Attorney, Agent, or Firm* — Wolf, Greenfield & Sacks, P.C.

(57) ABSTRACT

Among other things, a method includes, at a computer system on which one or more computer programs are executing, receiving a specification defining types of state information, receiving an indication that an event associated with at least one of the computer programs has occurred, the event associated with execution of a function of the computer program, collecting state information describing the state of the execution of the computer program when the event occurred, generating an entry corresponding to the event, the entry including elements of the collected state information, the elements of state information formatted according to the specification, and storing the entry. The log can be parsed to generate a visualization of computer program execution.

29 Claims, 14 Drawing Sheets

(51) Int. Cl.
*G06F 11/32* (2006.01)
*G06F 9/455* (2006.01)
*G06F 11/34* (2006.01)

(56) References Cited

U.S. PATENT DOCUMENTS

| | | | | |
|---|---|---|---|---|
| 5,862,381 | A * | 1/1999 | Advani | G01R 13/029 |
| | | | | 717/128 |
| 6,202,199 | B1 * | 3/2001 | Wygodny | G06F 11/3409 |
| | | | | 717/128 |
| 6,219,826 | B1 * | 4/2001 | De Pauw | G06F 11/323 |
| | | | | 717/116 |
| 6,226,787 | B1 * | 5/2001 | Serra | G06F 11/3664 |
| | | | | 717/130 |
| 6,332,212 | B1 * | 12/2001 | Organ et al. | 717/128 |
| 6,470,388 | B1 | 10/2002 | Niemi et al. | |
| 6,785,717 | B1 | 8/2004 | Nickerson et al. | |
| 7,281,241 | B2 * | 10/2007 | Benoudiz | G06F 11/3664 |
| | | | | 717/127 |
| 7,506,314 | B2 * | 3/2009 | Kollmann | G06F 11/3476 |
| | | | | 717/128 |
| 7,559,032 | B2 * | 7/2009 | King | G06F 9/542 |
| | | | | 717/104 |
| 7,661,094 | B2 * | 2/2010 | Blevin | G06F 11/3476 |
| | | | | 717/128 |
| 7,689,947 | B2 | 3/2010 | Challenger et al. | |
| 7,962,314 | B2 * | 6/2011 | Chernoff | G06F 9/542 |
| | | | | 717/130 |
| 8,055,752 | B1 | 11/2011 | Fong et al. | |
| 8,464,221 | B2 * | 6/2013 | Zheng | G06F 11/3664 |
| | | | | 717/124 |
| 8,935,673 | B1 * | 1/2015 | Ashkenazi | G06F 11/3656 |
| | | | | 717/100 |
| 2002/0120918 | A1 * | 8/2002 | Aizenbud-Reshef | G06F 8/34 |
| | | | | 717/127 |
| 2002/0120919 | A1 * | 8/2002 | Aizenbud-Reshef | G06F 8/34 |
| | | | | 717/127 |
| 2002/0157087 | A1 | 10/2002 | Jacobsz | |
| 2003/0037317 | A1 * | 2/2003 | Emberson | G06F 11/362 |
| | | | | 717/129 |
| 2003/0131325 | A1 | 7/2003 | Schubert et al. | |
| 2003/0159133 | A1 * | 8/2003 | Ferri | G06F 11/3636 |
| | | | | 717/130 |
| 2004/0117768 | A1 * | 6/2004 | Chang | G06F 11/3664 |
| | | | | 717/125 |
| 2005/0034106 | A1 * | 2/2005 | Kornerup | G06F 11/323 |
| | | | | 717/132 |
| 2005/0132337 | A1 * | 6/2005 | Wedel | G06F 11/3636 |
| | | | | 717/128 |
| 2005/0261875 | A1 | 11/2005 | Shrivastava et al. | |
| 2006/0230385 | A1 * | 10/2006 | Chang | G06F 8/20 |
| | | | | 717/127 |
| 2006/0248512 | A1 * | 11/2006 | Messmer | G06F 11/3664 |
| | | | | 717/125 |
| 2007/0234306 | A1 * | 10/2007 | Klinger | G06F 11/3495 |
| | | | | 717/128 |
| 2008/0059436 | A1 * | 3/2008 | Crocker | G06F 8/34 |
| | | | | 717/109 |
| 2008/0127067 | A1 * | 5/2008 | Aubertine | G06F 9/45508 |
| | | | | 717/115 |
| 2008/0148239 | A1 * | 6/2008 | Petrov | G06F 11/3636 |
| | | | | 717/128 |
| 2008/0155342 | A1 * | 6/2008 | O'Callahan | G06F 11/3636 |
| | | | | 714/38.14 |
| 2008/0209405 | A1 * | 8/2008 | Roberts | G06F 11/362 |
| | | | | 717/129 |
| 2011/0138366 | A1 * | 6/2011 | Wintergerst | G06F 11/3409 |
| | | | | 717/130 |
| 2011/0214108 | A1 * | 9/2011 | Grunberg | G06F 11/3612 |
| | | | | 717/128 |
| 2012/0159452 | A1 * | 6/2012 | DeLine | G06F 8/34 |
| | | | | 717/125 |
| 2013/0036403 | A1 * | 2/2013 | Geist | G06F 11/3636 |
| | | | | 717/125 |
| 2013/0227350 | A1 * | 8/2013 | O'Riordan | G06F 11/3476 |
| | | | | 714/45 |
| 2014/0047414 | A1 * | 2/2014 | Attar | G06F 9/4411 |
| | | | | 717/121 |

OTHER PUBLICATIONS

James Ashford et al., Dynamic Visualisation of Software State, 2011, [Retrieved on Nov. 20, 2015]. Retrieved from the internet: <URL: http://crpit.com/confpapers/CRPITV113Ashford.pdf> 9 Pages (1-9).*

International Search Report and Written Opinion issued in related application No. PCT/US14/15846 on Jul. 8, 2014.

[online] "Log4View" accessed online Jan. 16, 2014 < http://www.log4view.com/home/>, 2014 PROSA GmbH.

* cited by examiner

```
208 {  11:55:50.222 [DEBUG] abinitio.ace.appConf.editor.component.layout.BoxLayoutComponent NON-SPECIFIED [object
       UIPopupModel] S155: 18
                                                                              ─ 204
       <occ>
       <ui>558_18013</ui>
       <sm>log</sm>
       <lm>    NON-SPECIFIED [object UIPopupModel] S155: 18</lm>
       <co>global</co>
       <ci>7BFA3DA9-9823-A190-995D-4AEE01756F18</ci>
202 {  <st>136276175022Z</st>
       <in><oin><ds> NON-SPECIFIED [object UIPopupModel] S155: 18</ds><fn>function1</fn><ai><nva><nvp><pn>model</pn><pv>[object
       UIPopupModel]
       </pv></nvp><nvp><pn>childHeight</pn><pv>18</pv></nvp></nva></ai></oin></in>
       <lv><olv><ll>2</ll><dl>30</dl></olv></lv>
       </occ>

208 {  11:55:50.223 [DEBUG] abinitio.ace.appConf.editor.component.layout.BoxLayoutComponent    Adjust for
       minMeasuredHeight 18
                                                     ─ 206
       <occ>
       <ui>559_18013</ui>
       <sm>log</sm>
       <lm>      Adjust for minMeasuredHeight 18</lm>
       <co>global</co>
       <ci>7BFA3DA9-9823-A190-995D-4AEE01756F18</ci>
202 {  <st>136276175022Z</st>
       <in><oin><ds>      Adjust for minMeasuredMinHeight 18</ds><fn>function2</fn><ai><nva><nvp><pn>childHeight</pn><pv>18</pv>
       </nvp><nvp><pn>measuredMinHeight</pn><pv>18</pv></nvp></nva></ai></oin></in>
       <lv><olv><ll>2</ll><dl>30</dl></olv></lv>
       </occ>
```

```
<occ>                                   // Occurrence
  <ui>uniqueID</ui>                     // An identifier, unique to each log message, composed of an incremented number plus the time
                                        //   since we started in milliseconds (e.g., "9_24767")
  <type>type</type>                     // The type of occurrence
  <sm>stratum</sm>                      // The identifier of the stratum, typically a 2 or 3 character code that maps to something longer
                                        //   (e.g., "uis" represents "UI Setup")
  <lm>log message</lm>                  // The original log message (like "Request done")
  <co>calling object</co>               // A string representing the object that created this annotation, typically a class name
                                        //   (e.g., "abinitio.client.Sample::OneOfOurClasses")
  <ci>caller ID</ci>                    // The identifier for the calling object - this might be a unique ID or might be empty, depending
                                        //   on what, if anything, the instance "calls itself"
  <ca>call string</ca>                  // This is only used when running in a debugger, so won't ever be seen externally (included only for completeness)
  <st>start time</st>                   // Start time for this event (only time if this is not part of a span)
  <et>end time</et>                     // End time (only included if this event has a duration, which requires the developer specify when it
                                        //   starts and then, later, when it ends)
  <md>max duration</md>                 // Used only for events with a duration; if this is specified, it indicates how long the event can,
                                        //   at most, take; used to determine it hung/never ended
  <in>                                  // Detailed information
    <ds>description</ds>                // A place to put a text description of the event, if desired
    <fn>function</fn>                   // The name of the function within the calling object within which this event occurred
    <is>                                // Name-value arrays of info specific to this instance (if any)
      <nva>                             //   (e.g., "myName","editButton","mySize":"10")
        <nvp>                           // Name-value pair array
          <pn>name</pn>                 //   Name-value pair
          <pv>value</pv>                //     Name
        </nvp>                          //     Value
        <nvp>                           // Name-value pair
          <pn>name</pn>                 //   Name
          <pv>value</pv>                //   Value
        </nvp>
        . . .                           // (as many pairs as exist in the array)
      </nva>
    </is>
    <pa>                                // Name-value arrays of parameter info (e.g., "linkedName":"nextObject", "newSize":"12")
      <nva>                             // Name-value pair array
        <nvp>                           // Name-value pair
          <pn>name</pn>                 //   Name
          <pv>value</pv>                //   Value
```

300

302

304

```
<nvp>
  <pn>name</pn>
  <pv>value</pv>
</nvp>
  .
  .
  .
</nva>
</pa>
<ai>
<nva>
  <nvp>
    <pn>name</pn>
    <pv>value</pv>
  </nvp>
  <nvp>
    <pn>name</pn>
    <pv>value</pv>
  </nvp>
  .
  .
  .
</nva>
</ai>
</in>
<sp>
  <osp>
    <id>span id</id>
    <nm>span name</nm>
    <sl>span level</sl>
    <sy>span type</sy>
  </osp>
  <osp>
    <id>span id</id>
    <nm>span name</nm>
    <sl>span level</sl>
    <sy>span type</sy>
  </osp>
  .
  .
  .
</sp>
```

302

</nvp>   //
  Name-value pair
    Name
    Value (as many pairs as exist in the array)

Name-value arrays of additional info (might include info about other, related objects)
  Name-value pair array
    Name-value pair
      Name
      Value
    Name-value pair
      Name
      Value (as many pairs as exist in the array)

Span info (used to indicate that this event is part of a larger "span" of events) - lists all spans of which this is a part
  Occurrence span
    Span ID (numeric)
    Span name (string)
    Like log level: FATAL, ERROR, WARN, INFO, DEBUG (but numeric values representing those levels)
    Type of span, usually the default type and so not included
  Occurrence span
    Span ID (numeric)
    Span name (string)
    Like log level: FATAL, ERROR, WARN, INFO, DEBUG (but numeric values representing those levels)
    Type of span, usually the default type and so not included (as many spans as exist for this, which is usually none but which could be dozens)

```
<bi>
  <nva>
    <nvp>
      <pn>name</pn>
      <pv>value</pv>
    </nvp>
    <nvp>
      <pn>name</pn>
      <pv>value</pv>
    </nvp>
    ...
  </nva>
</bi>
<ei>
  <nva>
    <nvp>
      <pn>name</pn>
      <pv>value</pv>
    </nvp>
    <nvp>
      <pn>name</pn>
      <pv>value</pv>
    </nvp>
    ...
  </nva>
</ei>
<lv>
  <ll>log level</ll>
  <dl>detail level</dl>
</lv>
</occ>
```

302 (left brace)

304 (right brace):

Name-value arrays of "beginning items" - information (if any) pertinent to when this occurrence started, like number of files open
  Name-value pair array
    Name-value pair
      Name
      Value
    Name-value pair
      Name
      Value
    (as many pairs as exist in the array)

Name-value arrays of "ending items" - information (if any) pertinent to when this occurrence ended, like result values
  Name-value pair array
    Name-value pair
      Name
      Value
    Name-value pair
      Name
      Value
    (as many pairs as exist in the array)

Occurrence level - a combination of log level (FATAL, DEBUG, etc) and detail LEVEL

RECORDING PROGRAM EXECUTION

This application claims priority to Provisional Patent Application Ser. No. 61/798,246, filed on Mar. 15, 2013, the entire contents of which are hereby incorporated by reference.

BACKGROUND

This description relates to recording program execution.

A computer program can be said to be executing when a microprocessor carries out instructions making up the computer program. Computer programs are typically arranged into functions (sometimes called procedures or methods) that contain a subset of the instructions of the program. In this way, a function of the computer program can be said to be executing when a computer system is carrying out the instructions of the function. Further, the execution of the computer program can sometimes be recorded in the form of a log.

SUMMARY

In a first aspect, a method includes, at a computer system on which one or more computer programs are executing, receiving a specification defining types of state information, receiving an indication that an event associated with at least one of the computer programs has occurred, the event associated with execution of a function of the computer program, collecting state information describing the state of the execution of the computer program when the event occurred, generating an entry corresponding to the event, the entry including elements of the collected state information, the elements of state information formatted according to the specification, and storing the entry.

In a second aspect according to the first aspect, each entry contains a first portion of data formatted according to a native format of a debugger mechanism that generates a log file containing the entries, the first portion of data including at least one of a timestamp and a debugger message, and wherein each entry contains a second portion of data formatted according to the specification defining types of state information, wherein the data formatted according to the specification is in a format other than a native format of a debugger mechanism that generates the log file, and wherein the data formatted according to the specification includes the elements of state information each tagged based on tags defined by the specification.

In a third aspect according to the first or second aspect, the specification defines an identification of an instance of an object from which the function was executed.

In a fourth aspect according to any of the first through third aspects, the specification defines an identification of the function and defines an identification of a time at which the function was called.

In a fifth aspect according to the fourth aspect, the specification defines arguments passed to the function and defines variables associated with the function.

In a sixth aspect according to the fourth aspect, the specification defines at least one of an identification of variables passed to the function, output of the function, or another function that called the function.

In a seventh aspect according to any of the first through sixth aspects, the specification defines a format that is compatible with a facility that generates a visualization of execution of at least one of the computer programs.

In an eighth aspect according to any of the first through seventh aspects, the specification is an XML specification.

In a ninth aspect according to any of the first through eighth aspects, at least some of the types of state information in the entry are identified by tags.

In a tenth aspect according to any of the first through ninth aspects, a level of logging is dynamically adjusted during execution of at least one of the computer programs, wherein different types of events are logged when different levels of logging are specified.

In an eleventh aspect according to any of the first through tenth aspects, a level of detail of logging is dynamically adjusted during execution of at least one of the computer programs, wherein for the same type of event, different amounts of information are logged when different levels of details of logging are specified.

In a twelfth aspect according to any of the first through eleventh aspects, a first command and a second command are received, wherein the first command indicates a threshold for events that should be recorded; wherein the second command indicates a level of detail that should be recorded in each log entry; and entries for events that satisfy the threshold for events that should be recorded are generated at the indicated level of detail.

In a thirteenth aspect according to any of the first through twelfth aspects, a threshold for events that should be stored is received for a class defining an object type of one or more of the computer programs, and entries for events that satisfy the threshold when a function belonging to the class is executing are generated.

In a fourteenth aspect according to any of the first through thirteenth aspects, a level of detail that should be recorded in each log entry is received for a class defining an object type of one or more of the computer programs; and entries for events at the level of detail when a function belonging to the class is executing are generated.

In a fifteenth aspect, a method includes, at a first computer system, receiving a log including entries generated based on events that occurred during an execution of one or more computer programs on a second computer system, the entries including state information describing a state of execution of at least one of the computer programs at the time at which the respective event occurred, parsing the log to extract information representative of the execution of at least one of the computer programs over a period of time, and based on the parsed log, generating a visualization of the execution of at least one of the computer programs, the visualization including at least one graphic representing a passage of time associated with the execution of a portion of at least one of the computer programs.

In a sixteenth aspect according to the fifteenth aspect, at least some of the entries are associated with execution of a call to a function of at least one of the computer programs.

In a seventeenth aspect according to the fifteenth or sixteenth aspect, the log is generated at a second computer system and the log is provided from the second computer system to the first computer system.

In an eighteenth aspect according to any of the fifteenth through seventeenth aspects, the visualization is displayed in a user interface.

In a nineteenth aspect according to any of the fifteenth through eighteenth aspects, the visualization includes a graphical representation of functions of at least one of the computer programs.

In a twentieth aspect according to the nineteenth aspect, the graphical representation of the functions includes a graphical representation of time of execution of the functions.

In a twenty-first aspect according to the nineteenth or twentieth aspects, at least some of the graphical representations include interactive functionality determined based on the entries of the log.

In a twenty-second aspect according to the nineteenth, twentieth, or twenty-first aspects, the graphical representation includes a span representing a plurality of functions executed in association with one another.

In a twenty-third aspect according to the twenty-second aspect, each of the plurality of the functions was called by another of the plurality of the functions during the execution of at least one of the computer programs.

In a twenty-fourth aspect according to any of the fifteenth through twenty-third aspects, the visualization includes a tabular representation of state information of at least one of the computer programs.

In a twenty-fifth aspect according to any of the fifteenth through twenty-fourth aspects, the log includes a format defined according to an XML specification.

In a twenty-sixth aspect according to the twenty-fifth aspect, the XML specification defines tags corresponding to state information of computer programs.

In a twenty-seventh aspect according to any of the fifteenth through twenty-sixth aspects, the visualization shows a plurality of layers and relationships among events that occur at the plurality of layers during execution of the computer program.

In a twenty-eighth aspect according to the twenty-seventh aspect, the layers include a layer representing user interactions, and the visualization shows relationships among user interactions and other events.

In a twenty-ninth aspect according to any of the fifteenth through twenty-eighth aspects, the visualization includes layers each corresponding to a portion of at least one of the computer programs, the visualization including representations of functions that are executed when the at least one computer program is executed, each representation of a function being positioned in a layer that corresponds to a portion of the computer program corresponding to the function.

In a thirtieth aspect according to any of the fifteenth through twenty-ninth aspects, the visualization includes a replay of at least a portion of the execution of the computer program, the replay showing which functions were called, values that were passed to the functions that were called, and inputs provided by users during the execution of the computer program.

One or more of the aspects, alone or in combination, may be represented as a system, or an apparatus, or as a computer readable storage device storing a computer program product including machine readable instructions that, when executed by a computer system, carry out operations of the aspect. As one example, a computer readable storage device can store a computer program product including machine readable instructions that, when executed by a computer system, carry out operations according to any one of the first through thirtieth aspects. As another example, a computer system including one or more processors can include a computer-readable storage device storing a computer program product that includes machine readable instructions that, when executed by the one or more processors, carry out operations according to any one of the first through thirtieth aspects.

Other features and advantages of the invention will become apparent from the following description, and from the claims.

DESCRIPTION OF DRAWINGS

FIG. 2 shows an annotated log file.
FIGS. 3A through 3C show an XML specification.

DESCRIPTION

A log (sometimes referred to as an error log or debug log) generated during execution of a program can include entries that indicate debugging messages that a programmer inserted into the program. The log can also include annotations that indicate information about which functions (sometimes referred to as subroutines, methods, or segments) of the program were executing when an entry of the log was recorded. The annotated log can be used to reconstruct the execution of the program based on the information included in the annotations. For example, a graphical representation of the execution could be presented to a user who wishes to visualize the execution of the program. The annotated log could be used for other purposes, for example, viewing the execution of the program in tabular form. In this way, a debugger operating concurrently with (e.g., at the same time as) an execution of the computer program need not be used. Accordingly, the techniques described here have the advantage of increasing the number of ways in which the execution of a program can be analyzed and debugged.

Figure 1A:
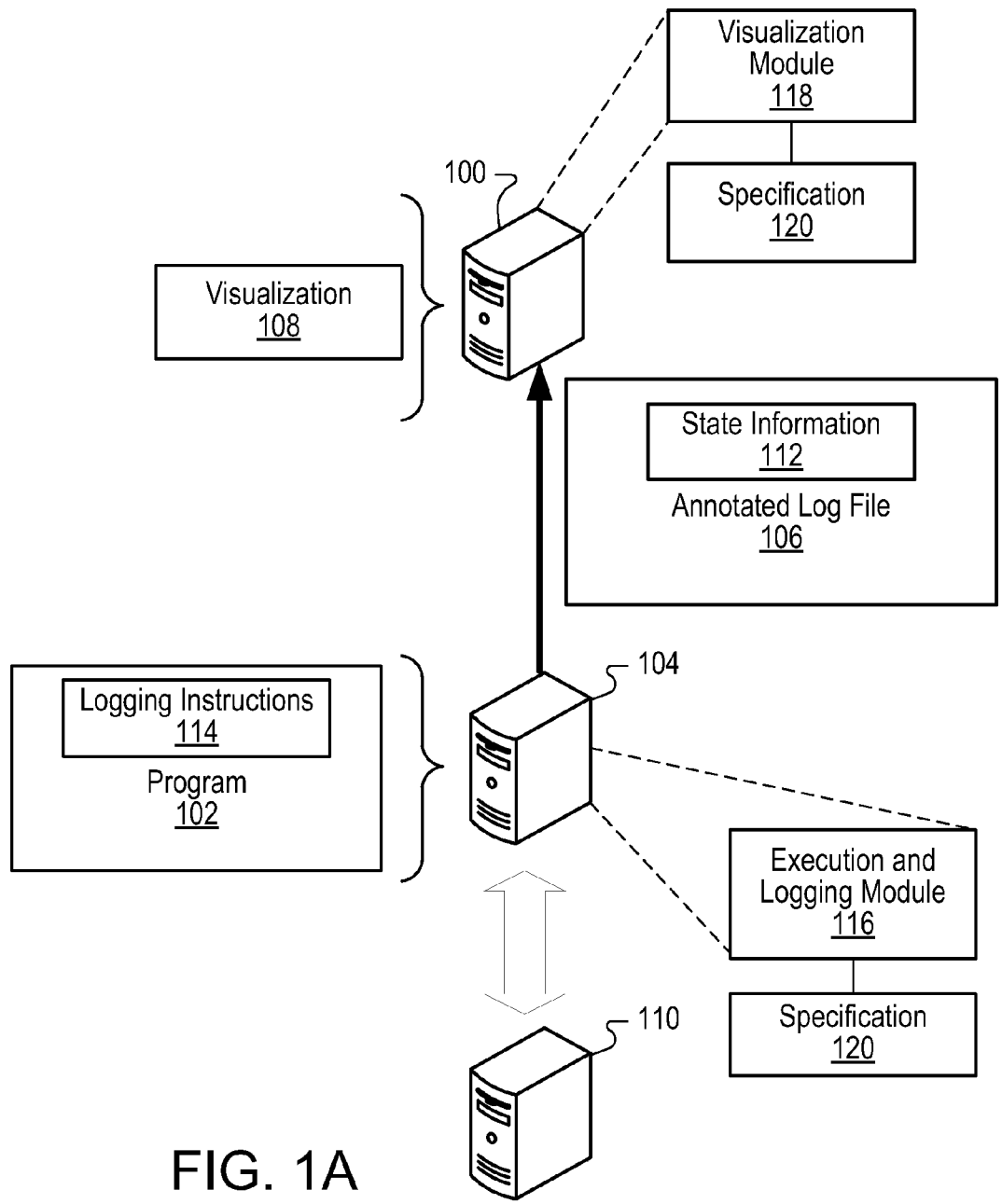
FIG. 1A shows a computer system and related components.

FIG. 1A shows a computer system 100 and related components. The computer system 100 can be used to visualize the execution of a computer program 102 that executed on another computer system 104. In some implementations, the computer system 104 generates an annotated log file 106 that contains information representative of the execution of the computer program 102. For example, the annotated log file 106 can include information identifying functions of the computer program 102 that were executing when an entry of the annotated log file 106 was recorded. (Although we describe a log file storing a log of entries, a log could take the form of a database or other data storage technique other than a file in the traditional sense.)

In some examples, the annotated log file 106 is generated during the execution of the computer program 102. For example, the other computer system 104 may include an execution and logging module 116 that carries out the execution of the computer program 102. The execution and logging module 116 may cause one or more microprocessors of the computer system 104 to execute the instructions that make up the computer program 102. Some of the instructions may include logging instructions 114 that cause the computer system 104 to generate the log file 106 as the computer program 102 is executed.

The annotated log file 106 can be provided to the computer system 100 (e.g., transmitted over a network, or provided on a data storage device). In response, the computer system 100 can generate a visualization 108 of the execution of the computer program 102. For example, the visualization 108 can be presented on a user interface executing on the computer system 100. The user interface may be generated by a visualization module 118 that takes in the annotated log file 106 and generates the visualization 108 based on the contents of the annotated log file. In this way, the visualization 108 can be presented independent of the time at which the computer program 102 is executing. For example, the computer program 102 could execute on a particular day, and then the annotated log file 106 can be provided to the computer system 100 on a different day, which could be weeks or months or years later. The annotated log file 106 can be used by the computer system 100 to generate the visualization 108 if the annotated log file contains state information that can be used to re-enact the execution of the computer program 102 and generate a representation of the re-enactment in the visualization 108. For example, some of the state information represented in FIGS. 3A-3C can be used to re-enact the execution of the computer program 102.

A visualization is a representation of data in a form other than a native format of the data. For example, if the annotated log file 106 takes the form of text, then a visualization can include elements other than text, e.g., tables or graphics. The elements other than text can be generated based on the data of the annotated log file 106. In some examples, graphics displayed in the visualization can have a semantic meaning that is based on a semantic meaning of some of the data in the annotated log file 106. For example, if the annotated log file 106 indicates that a function began executing at a particular time, the visualization can include a graphical element that represents the execution of the function. A visualization may also have interactive elements. For example, a visualization may be displayed on a user interface and include graphical elements with which a user of the user interface can interact. In some examples, when a user interacts with the graphical elements (e.g., using an input device), the graphical elements change, or other graphical elements are displayed, or other behavior of the graphical elements may occur. The graphical elements may be generated based on the text, and the way in which the graphical elements behave in the user interface may be based on the text.

In some examples, the visualization 108 is a representation of data other than a sequential representation. For example, the annotated log file 106 may include sequential entries of data, e.g., entries recorded in a sequence of their creation. The entries of the annotated log file 106 could be directly viewed or inspected (e.g., by a person who executed the program, or another person who wishes to review the execution of the program) by reading the text of the entries. The visualization 108 may take a form other than a representation of the sequential entries. For example, the visualization 108 may contain visual elements that represent passage of time based on the sequential entries, but need not contain visual elements corresponding to any of the sequential entries.

In some implementations, the computer system 104 executing the computer program 102 interacts with other computer systems 110 during the execution of the computer program 102. The computer program 102 may include instructions referencing resources available on the other computer systems 110. For example, the computer program 102 may be a client program that interacts with a server available on the network, e.g., accessing data on the server or causing functions to execute on the server (e.g., one of the computer systems 110). As another example, the computer program 102 may be a distributed computer program. A distributed computer program is configured in a way that some of its instructions (e.g., functions or portions of functions) execute on one computer system and other instructions execute on other computer systems.

In some implementations, the computer program 102 is implemented in an object-oriented language. An object is a collection of functions and data (e.g., variables and constant values). In this way, the computer program 102, when executed, may take the form of one or more objects that are instantiated (e.g., generated from classes which specify functions and data of an object).

In some implementations, the annotated log file 106 can contain state information 112 of the computer program 102. State information 112 may include information about the computer program 102 as it executes. For example, state information 112 can include information about which functions of the computer program 102 are executing at a particular point in time. The state information 112 can also include arguments passed to the functions (sometimes called parameters), values of variables defined within the functions, and outputs of the functions. The state information 112 can also include information about objects of the function, for example, objects that have been instantiated, variables defined within the objects, and other information. The state information 112 can be formatted for use by a facility (e.g., the computer system 100) that can generate a visualization of execution of the computer program 102 based on the state information 112.

The format of the annotated log file 106 can be determined based on a specification 120. The specification 120 can be shared among computer systems (e.g., the computer systems 100, 104 shown in the figure) which generate and process annotated log files. Because annotated log files can have a common format as defined by the specification 120, a computer system that has access to the specification 120 can generate and process the annotated log file 106.

A copy of the specification 120 can be made available to the visualization module 118 on one computer system 100 and a copy of the specification 120 can be made available to the execution and logging module 116 on the other computer system 104. The modules can generate and process the annotated log file 106 based on the format defined in the specification 120.

Figure 1B:
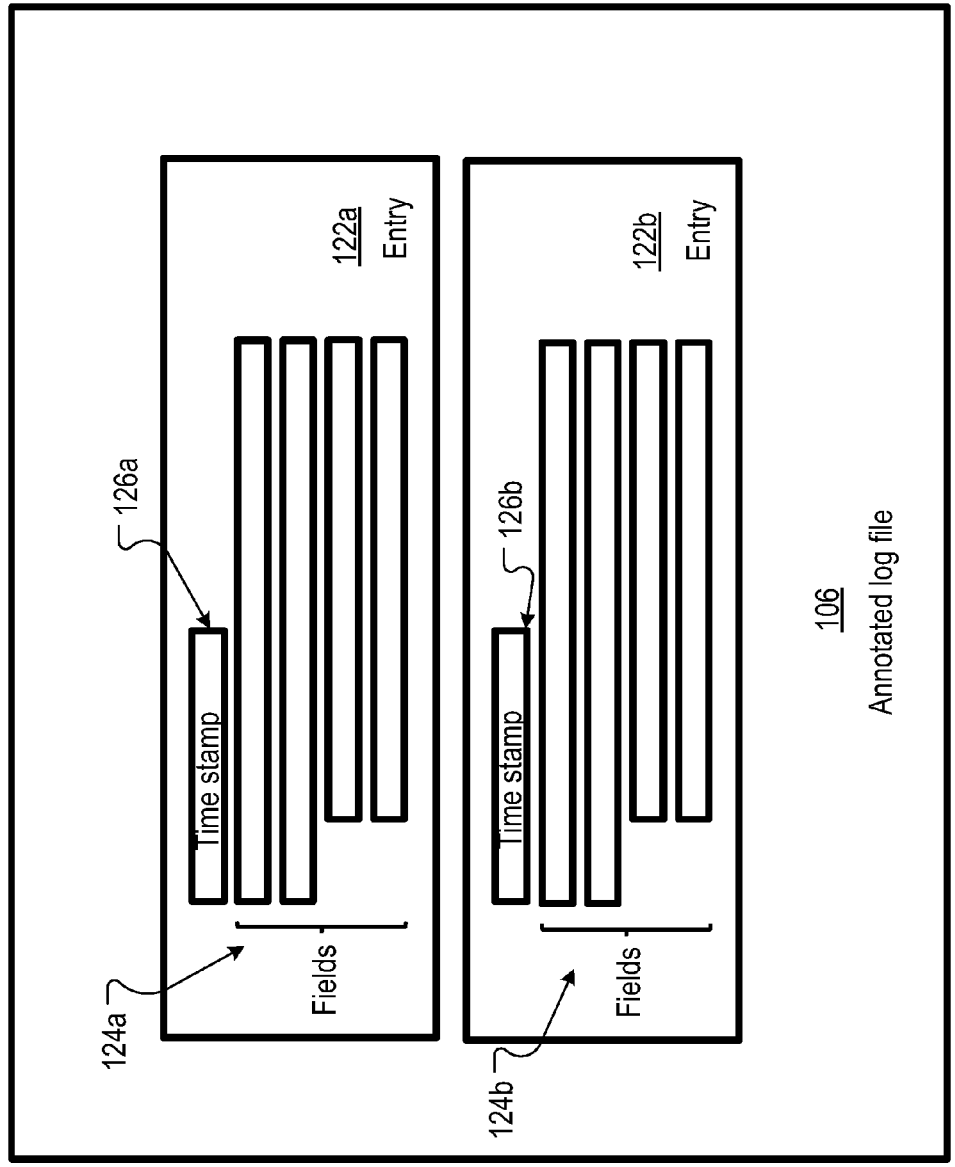
FIG. 1B shows a block diagram of an annotated log file.

FIG. 1B shows an example of an annotated log file 106. In the example shown, the annotated log file 106 includes entries 122a, 122b each made up of fields 124a, 124b. The fields 124a, 124b contain information representative of the execution of a computer program (e.g., the computer program 102 shown in FIG. 1A) corresponding to the annotated log file 106. The fields 124a, 124b can contain state information 122 describing the state of the computer program at a particular time, e.g., as indicated by time stamps 126a, 126b of the entries 122a, 122b. Some of the fields can be contained (nested) within other of the fields.

Figure 1C:
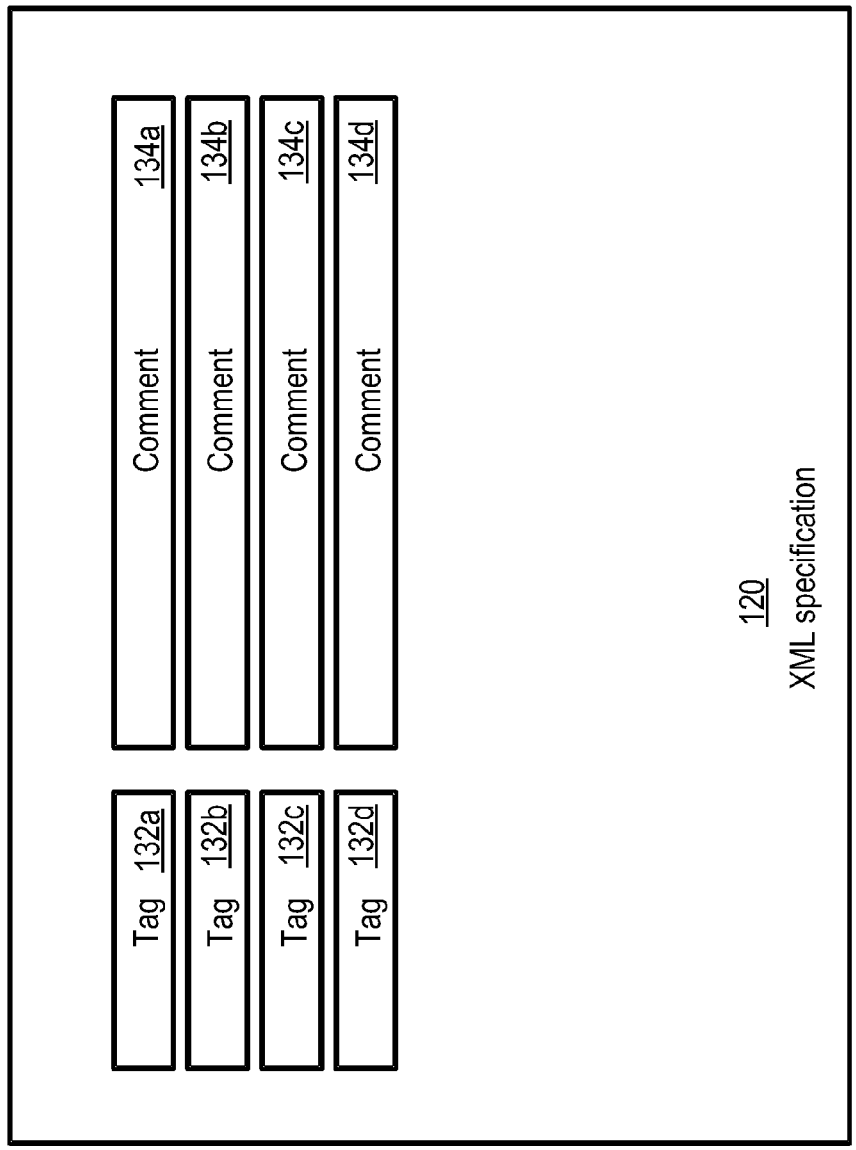
FIG. 1C shows a block diagram of a specification.

FIG. 1C shows an example of a specification 120. The specification can include tags 132a-d, each of which defines information that can be recorded in an annotated log file 106 (FIG. 1A). For example, one or more of the tags 132a-d may define information recorded in entries 122a, 122b (FIG. 1B) of the annotated log file 106. Each of the fields 124a, 124b of the entries 122a, 122b may correspond to a particular tag 132a-d. In this way, the purpose of an entry 122a, 122b is defined according to the specification 120. In some implementations, the specification 120 also includes comments 134a-d that include human-readable information describing the tags 132a-d.

FIG. 2 shows a portion of an annotated log file 200. The annotated log file 200 could be an example of the annotated log file 106 shown in FIG. 1A. This annotated log file 200 includes fields 202 that contain information representative of the execution of a computer program (e.g., the computer program 102 shown in FIG. 1A) corresponding to the annotated log file 200. In this way, the annotated log file 200 (e.g., in the fields 202) may contain state information that enables the system 100 to re-enact the execution of the computer program and generate a visualization of the execution. The annotated log file 200 includes entries, e.g., entries 204, 206 that are recorded as a computer program is executed. In some examples, the entries 204, 206 are recorded in response to events that occur during the execution of the corresponding computer program. An event can be any activity of the computer program. For example, the event may be the execution of a particular instruction. In some examples, the instruction explicitly calls for an entry to be written to the annotated log file 200, e.g., an instruction to write a debug message to the log file. A debug message is a message that indicates information that can be used by a programmer to debug the program. In some examples, the instruction does not explicitly call for an entry to be written to the annotated log file 200. For example, the computer program may be configured to write an entry to the annotated log file 200 each time a function is called or a function returns (e.g., finishes executing and provides output data to a calling function). The function can be identified in a field 202 of the respective entry 204, 206.

The example shown in the figure could represent the pseudocode computer program shown below:

```
Object global (UIPopupModel) {
    main( ) {function1(UIPopupModel, 18);}
}
function1(model, childHeight) {
    writeLog( );
    function2(childHeight, 18);
}
function2(childHeight, measuredMinHeight) {
    writeLog("Adjust for minMeasuredHeight 18");
}
```

In this example, each entry 204, 206 includes fields 202, which include tags, as well as an untagged portion 208. The untagged portion 208 does not include tags and is formatted in a manner that can be read by a person viewing the log file as plain text, e.g., formatted according to a native format of a debugger mechanism that produces messages intended for viewing as plain text. For example, the log message may include text (e.g., text written by a programmer and included in the code of the program represented by the log file, for example, as an argument to a function call for writing a log message) that is written to the log file when a particular event occurs. For example, the log message could be indicated by a "writeLog" function as shown in the above pseudocode. In some examples, a log message is not based on text written by a programmer. For example, the log message could be an automatically generated message, e.g., that is generated by the program when a function begins executing.

The log message can also appear in one of the fields 202 indicated in the entries by the tag "<lm>." Other tagged portions of each entry 204, 206 are indicated by other tags.

Each entry 204, 206 also includes information about the function that was executing when the respective entry 204, 206 was recorded. A function name ("<lm>") identifies the particular function, e.g., the function name used in the original program code of the computer program. For example, the function names "function1" and "function2" are shown in the above pseudocode. The purpose of each tag is described below with respect to FIGS. 3A-3C. Because each entry 204, 206 includes both fields 202 that are tagged, and an untagged portion 208, the annotated log file 200 can be viewed as plain text in a way that is human-readable, and can also be used as a machine-readable input to a visualization mechanism, described in greater detail below.

In some implementations, state information can be recorded in an annotated log file in a format defined by a schema. A schema defines different types of state information that can be recorded in an entry. The schema defines this information in a way that is machine readable, for example, such that a computer system can identify the type of a portion of state information by consulting the schema. For example, when an entry is recorded, the entry is made up of different pieces of information, and each piece of information corresponds to one of the types of state information defined by the schema. An entry need not contain all of the types of state information defined in the schema, but each piece of information represented as state information in the entry does correspond to a type of information defined by the schema.

FIGS. 3A-3C show an XML specification 300 (sometimes called a schema) for fields of an annotated log file. Although a particular XML specification 300 is used here as an example, this is only an example, and any other XML specification or other kind of specification could be used to implement the techniques described here. In this example, the fields could be the fields 202 of the annotated log file 200 shown in FIG. 2. The XML specification includes tags 302 that specify the fields and comments 304 that indicate the purpose of each of the tags 302. In general, each tag corresponds to a particular type of state information, such that each element of state information can be tagged. Some of the tags 302 are described in detail below with respect to FIGS. 5A and 5B. For example, some of the tags 302 may represent fields containing information specific to an instance of an object (e.g., variables of an object instance and their values), arguments passed to a function, and other fields as described below. When a log file is generated, the information contained in some of the tags 302 enables the system 100 to re-enact the execution of a computer program and generate a visualization of the execution of the computer program (e.g., as shown below in FIGS. 4A-4B).

An XML specification can be accessed by various computer programs written in different programming languages. Because an XML specification is used to define the format of the fields 202 of the annotated log file 200, the same log file format can be used independent of a programming language used to write the computer program associated with the annotated log file. For example, an annotated log file associated with one computer program written in a first programming language (e.g., Java) can use the format defined by the XML specification 300, and another annotated log file associated with another computer program written in another programming language (e.g., Flex) can use the same format defined by the XML specification 300. In some examples, a language other than XML can be used, for example, a different markup language could be used. In general, any manner of delimiting and identifying different fields in a body of data could be used.

Several types of tags are shown in FIGS. 3A-3C. Some are described in further detail with respect to FIGS. 5A-5B. The tag <ui> specifies a unique identifier of a particular log entry. The tag <type> identifies a type of event (sometimes called an occurrence) represented by the log entry. The tag <sm> specifies a stratum associated with the entry. The tag <lm> indicates a portion of text describing the log entry, e.g., an event that caused the log entry to be recorded. The tag <co> indicates an object that called the function that was executing when the entry was recorded. The tag <ci> is a unique identifier (e.g., other than an object name) of the calling object. The tags <st> and <et> indicate the start and end times of an event (e.g., execution of a function) associated with the log entry. The tag <md> indicates a maximum duration, e.g., the maximum amount of time over which a function is allowed to execute. Tags <li> and <dl> can indicate a log level and a level of detail for the log.

Figure 4A:
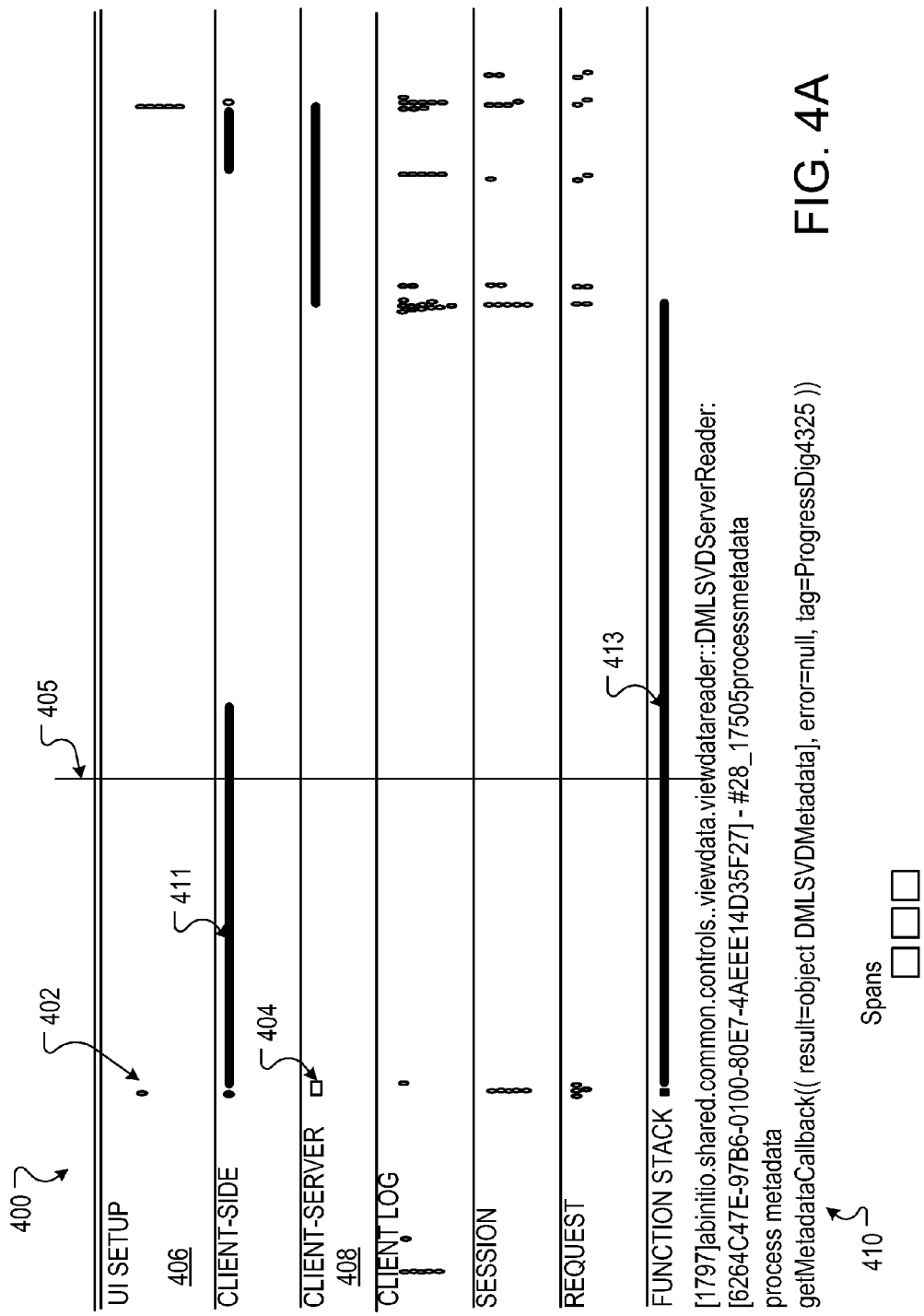
FIGS. 4A through 5B show visualizations of a log file.
Figure 4B:
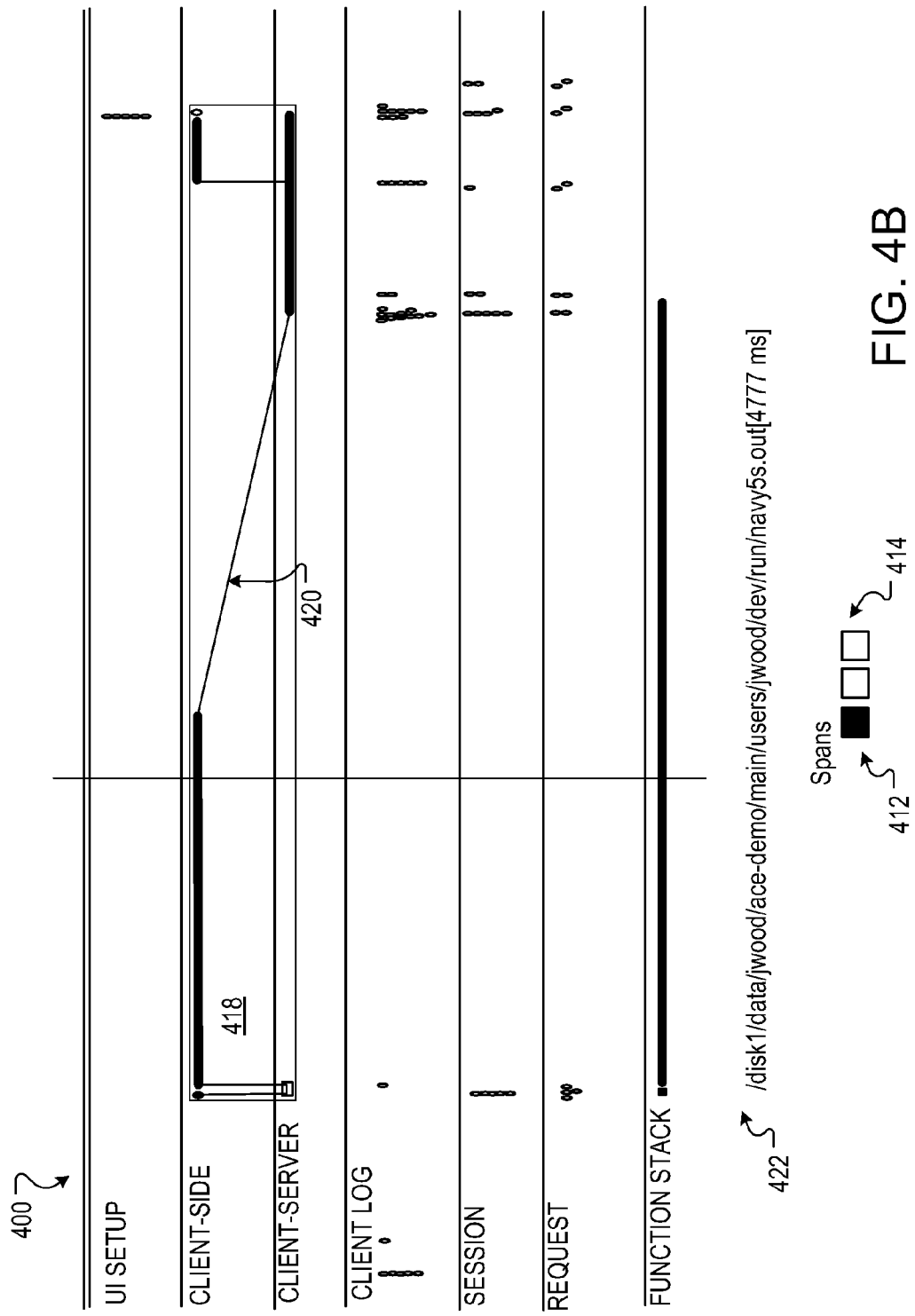

The specification can also include detailed information under an <in> tag. For example, the information could include a description (<ds>) of an associated event, a name of the function that is executing (<fn>), and tags (<pn>, <pv>) that indicate parameters and values of the parameters passed to the function. The parameters could be specific to an instance of an object or function (labeled <is>). Other tags may indicate parameters and values pertinent to when the event began (<bi>) or ended (<ei>). FIGS. 4A-4B show a visualization 400 of the execution of a computer program that includes a number of functions. This visualization is sometimes referred to as a timeline visualization, since it demonstrates the progression of execution over time. Although the visualization 400 shown here represents a single computer program, the visualization could also be used to represent the execution of multiple computer programs, e.g., based on more than one log file. For example, the visualization 400 could be an example of the visualization 108 shown in FIG. 1A. The visualization 400 could be displayed on a user interface of a computer system (e.g., the computer system 100 shown in FIG. 1A). This visualization represents the execution of the first and second functions of the computer program over time. The execution of the first and second functions is represented in the form of bars, such that the length of each bar is proportional to execution time.

The bars can be placed in one or more layers, such as layers 406, 408, sometimes called strata. For example, the layers 406, 408 can correspond to portions or layers of the computer program represented by the visualization. In some implementations, different layers 406, 408 represent different components that execute on different computer systems (e.g., the computer systems 104, 110 shown in FIG. 1A). In some examples, the layers 406, 408 represent logical divisions of work performed by the computer program. For example, the computer program can have layers such as a user interface layer, a client-server interaction layer, and other layers into which the computer program is divided. In some examples, the layers are defined by a programmer for the benefit of the visualization or a related function such as a debugger, and need not have other meaning within the context of the execution of the program. Each layer of the computer program can have a corresponding layer in the visualization 400, such as a user interface layer and a client-server interaction layer. In this way, the visualization 400 can indicate which functions are associated with which layers. For example, one function may be associated with the user interface of the computer program and includes instructions relating to user interface elements, and a bar 402 representing the execution of the function can be shown in the user interface layer 406. Another function may be associated with client-server interaction of the computer program and includes instructions related to network communications, and a bar 404 representing the execution of the function can be shown in the client-server interaction layer 408. In some implementations, the log file used to generate the visualization 400 can indicate a layer associated with each respective function.

The visualization 400 can help a program developer obtain a better understanding of the execution of a computer program, such as why the computer program produce errors, or is slow or unresponsive. For example, if the visualization 400 is being used to determine if a computer system is slow or unresponsive, the visualization 400 may show that after a button was clicked in a user interface, it took 20 seconds for a result to return, and during the 20 seconds several processes are executed at different layers. This allows a user viewing the visualization 400 to identify where a problem may have occurred, e.g., at the client side instead of the server side. In contrast, a user viewing a log file would not be able to see this information. For example, during the 20 seconds from when the button was clicked to the return on the results, there may be thousands of entries (each of which may be many lines of text) in the log file. It may be difficult to determine what the problem is by manual inspection of those thousands of lines of text, for example.

Bars 411, 413 representing functions that executed concurrently are displayed as overlapping the same point in time, here represented as a vertical line 405. There may be several functions or components associated with the same layer that execute concurrently. This is represented by bars or segments in a single layer that extend parallel to one another.

As shown in FIG. 4A, a user viewing the visualization 400 could hover a cursor (e.g., of an input device such as a mouse, trackpad, or touchscreen) over one of the bars, e.g., bar 402. An identification 410 of the function represented by the bar 402 is then displayed in the visualization 400. The identification 410 could include state information (e.g., derived from the state information 112 shown in FIG. 1A) such as another function that called the function represented by the bar 402, arguments provided to the function represented by the bar 402, output values of the function represented by the bar 402, and other information about the function represented by the bar 402.

As shown in FIG. 4B, the visualization 400 includes span indicators 412, 414 that each indicate spans of multiple functions are present among the functions shown in the visualization 400. In general, a span is a collection of functions that have executed. In some examples, functions of a span are each identified with a marker. For example, the program code defining the functions could include a label or other identifier associated with each function of the span or an object class containing functions of the span. In some implementations, a span within a computer program is marked within program code of the computer program by indicating a "beginSpan( )" function call at the beginning of the span and an "endSpan( )" function call at the end of the span, as determined by the programmer.

In some examples, a span is a series of functions that cause other functions to execute until all of the functions in the span are complete. In some implementations, some functions of a span directly call other functions of the span, e.g., some functions include instructions that call some of the other functions and may, for example, pass arguments to the other functions. This is sometimes called a synchronous span or a function span. In some implementations, some functions of a span do not directly call one another. For example, one of the functions executing as part of a first thread of a computer program may make a remote procedure call to a second thread and then continue executing while the second thread carries out the operations called. Further, the remote procedure call may be returned, and then another function could be called from the first thread or the second thread in response. Functions of the various threads may all be part of the same span. This is sometimes called an asynchronous span. A span can contain another span?] or overlap with another span. For example, the beginning of a second span can occur before a first span ends, for example, if a function marked as belonging to the second span is called by a function marked as belonging to the first span. In some examples, an asynchronous span may contain one or more function spans. For example, an asynchronous activity "A" can be associated with span "S1." The asynchronous activity "A" begins at time T1 and ends at time T1+1000. At time T1+200, activity "B" (which may be synchronous), associated with span "S2," begins. It continues until time T1+1300. In this way, synchronous span "S2" overlaps with asynchronous span "S1."

A user can invoke (e.g., click, select, highlight, or otherwise indicate using an input device) one of the span indicators, e.g., 412, to display a span 418. The span 418 includes multiple functions and also includes a line 420 representing the flow of data among the functions. For example, a first function can process data, pass some of the data to a second function as arguments to the function, and then the second function can process the data further, and so on. The display of a span 418 can be used to examine the execution of multiple functions that interact with each other. When the span 418 is displayed, information 422 about the span can also be displayed in the visualization 400. For example, the information 422 could include state information related to the span 418, such as an output of the last function that executes in the span.

In some implementations, the visualization 400 could be displayed as an animation. For example, the visualization 400 could be animated by displaying the functions 402, 404 over an amount of time representing the time in which the corresponding computer program executed. The functions 402, 404 could appear in the visualization 400 in the sequence in which they were executed when the corresponding computer program was originally executed. Further, the bars representing the functions 402, 404 could grow to represent the amount of time that the functions took to execute to completion. This type of animation is sometimes called a replay of the execution of the computer program.

Figure 5A:
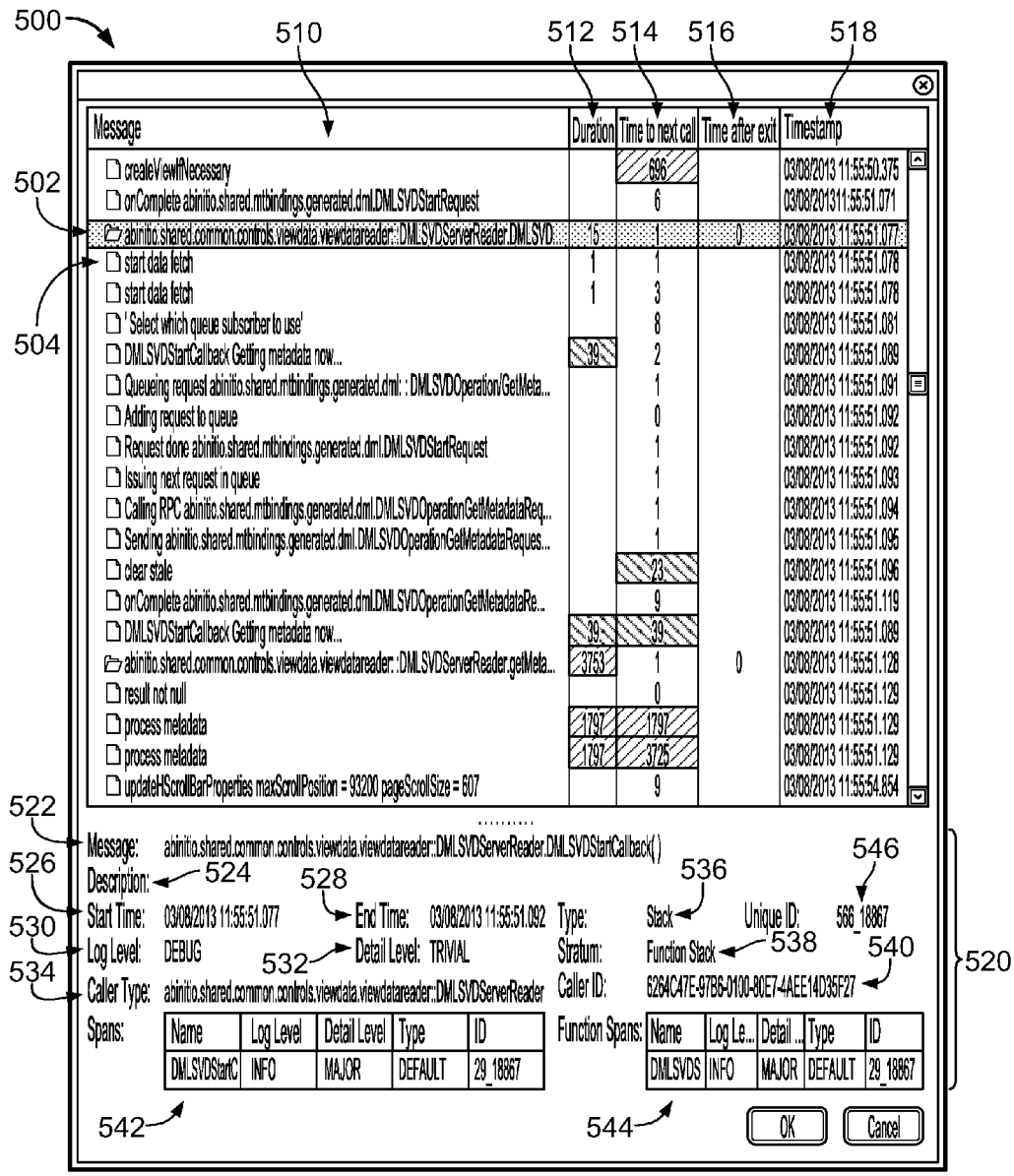

An advantage of the visualization 400 is that information contained in a large log file having hundreds or thousands of lines can be presented in a single graph to allow a program developer to quickly identify errors or bottlenecks in the execution of the computer program. This technique also provides a quick visualization of which portion of a system is executing the various pieces of functionality. FIG. 5A shows a tabular visualization 500 of the execution of a computer program. A tabular visualization is another kind of visualization, besides the timeline visualization shown in FIGS. 4A-4C. For example, the tabular visualization 500 could be an example of the visualization 108 shown in FIG. 1A. The tabular visualization 500 could be displayed on a user interface of a computer system (e.g., the computer system 100 shown in FIG. 1A). The tabular visualization 500 includes entries, e.g., entries 502, 504 that correspond to entries of the log file 200 shown in FIG. 2. For each applicable entry, the tabular visualization 500 includes columns representing fields of the entries, e.g., the fields 202 shown in FIG. 2. A message 510 represents a message indicated by the instructions of the computer program, e.g., a debugging message written by a programmer who wrote the program. A duration 512 represents an amount of time instructions associated with the entry took to execute. A time to next call 514 indicates an amount of time elapsed in a function between the time at which the function begins executing and the time at which another function is called (e.g., in an instruction of the function that calls the other function and passes arguments to the function). Put another way, the time to next call indicates how much time passed between this entry and the next entry. A time after exit 516 indicates how much time elapsed between the end of a function and the start of the next function. Put another way, the time after exit indicates an amount of untracked time between the end of an entry and the beginning of the next entry. For example, this can be used for figuring out where there is functionality that needs to have logging added. For example, the time after exit 516 can be used to determine if there is a gap in the state information recorded in the log file. A timestamp 518 indicates the time at which the entry 502, 504 was recorded in a log file. For example, if the event that caused the entry 502, 504 to be recorded is a call to a function, the timestamp can correspond to a time at which the function was called.

The tabular visualization 500 includes a secondary pane 520 that includes information about a selected entry 502. The secondary pane 520 indicates additional information not shown in columnar format. A message 522 is a full version of the message 510 of the selected entry 502 shown above, which can be used to view data representing the message if the data does not fit in the columnar format (e.g., if the message is too long). A description 524 is a description of an event that caused the entry 502 to be generated (e.g., an event occurring during execution of the computer program). A start time 526 indicates a start time at which instructions associated with the entry began executing, and an end time 528 indicates an end time at which instructions associated with the entry finished executing.

A log level 530 indicates a threshold at which an entry 502 is recorded. Some examples of log levels, which are used in many types of debugger systems, are "DEBUG," "INFO," "WARN," "ERROR," and "FATAL." For example, if a log level of "FATAL" is selected, only entries triggered by an event representing a fatal error will be logged. Any type of log levels could be used with the techniques described here and the types of log levels are not limited to these examples. In some implementations, the computer system 104 generating the annotated log file 106 shown in FIG. 1A may enable a user of the computer system 104 to specify the log level 530 of the annotated log file 106.

In some examples, some types of entries will be included in the log file at one log level 530, while those same types of entries may not be included in the log file at another log level 530. For example, certain events occurring during the execution of the computer program may cause entries to be recorded at one log level 530 (e.g., "debug"), while those same events may not cause entries to be recorded at another log level 530 (e.g., "default").

A detail level 532 indicates a level of detail at which the entry 502 was recorded. For example, the computer system 104 generating the annotated log file 106 shown in FIG. 1A may enable a user of the computer system 104 to specify a level of detail of the annotated log file 106. In some examples, the level of detail corresponds to a number of fields of the log file that are included. For example, entries of the log file operating under one detail level 532 may include a subset of the possible fields specified by the XML specification 300 (FIGS. 3A-3C), while entries of the log file operating under another detail level 532 may include a different subset of the possible fields specified by the XML specification 300. One detail level 532 (e.g., "detailed") may cause a larger number of fields to be included, while another detail level 532 (e.g., "trivial") may cause a smaller number of fields to be included.

In some implementations, each class of a program can have its own log level and detail level. A class is a definition of an object type in an object-oriented program. In some examples, a configuration file can indicate the log level and detail level for some or all of the classes of a program. For example, the configuration file can be associated with the program. In this way, the log level or the detail level of a particular class can be changed without modifying the program code of a program.

In some examples, a type of an object containing the function that caused the entry 502 to be recorded is known. This can be indicated by the caller type 534.

A type 536 indicates a type of event that caused the entry 502 to be recorded. For example, some types may include "creation" (e.g., creation of an object), "stack" (e.g., an entry in a function stack such as a function enter/exit message), and "default" (other events).

A function stack is a hierarchical record of what nested function calls have been made and recorded. For example, a computer program could have the following three functions:

```
function a( )
{
    logEntry(a);
    x = 37;
    x = b(x);
    logExit(a);
}
function b(x)
{
    logEntry(b);
    x = c(x);
    logExit(b);
    return x;
}
function c(x)
{
    logEntry(c);
    print("Incrementing " + x);
    x = x + 1;
    logWithFunctionStack("x = " + x, "x", x);
    logExit(c);
    return x;
}
```

In this example, function a calls function b, and function b calls function c. A log entry produced by the logWithFunctionStack function call in function c would indicate a function stack of function a->function b->function c. In some implementations, a function stack can be represented in the form of a type of span called a function span.

A stratum 538 indicates a layer associated with the function that caused the entry 502 to be recorded. For example, the layer could be one of the layers (e.g., 406, 408) shown in FIG. 4A. Some layer types may include "User Interaction" (e.g., user interface items), "Client-side" (e.g., instructions executing on a client, e.g., the computer system 104 shown in FIG. 1A), "Client-server" (e.g., instructions handling interaction between a client and a server), and "Server-side" (e.g., instructions executing on a server, e.g., one of the computer systems 110 shown in FIG. 1A).

A caller identification 540 is a string that identifies a particular object that called the function executing when the entry 502 was recorded. For example, when any object is instantiated as part of the execution of the computer program, the object may be assigned a unique identifier.

A span 542 indicates a span to which this entry 502 belongs, e.g., a span containing the function that was executing when the entry 502 was recorded. For example, the span could be the span 418 shown in FIG. 4B.

A function span 544 indicates a function span to which this entry 502 belongs. Function spans are described above with respect to FIG. 4B. For example, the function span may be the function stack (e.g., series of function calls) that led to the generation of the entry 502, starting at a specific point such as a specific function.

The entry 502 can be assigned a unique id 546 when the entry 502 is written to the annotated log file.

Figure 5B:

FIG. 5B shows another view of the tabular visualization 500 in which the secondary pane 520 displays information relating to another entry 504. Here, the secondary pane 520 shows some additional information about this entry 504 not shown about the previous entry 502. Instance information 545 indicates information about an instance of an object. For example, the object may be an object from which a function was called, e.g., the function that was executing when the entry 504 was recorded. The instance information can include state information about the object, such as variables of the objects and values of the variables.

Parameters 548 are arguments provided to the function that was executing when the entry 504 was recorded. For example, the arguments may have been provided when the function was called.

The tabular visualization enables a person viewing the visualization to see any or all of the state information recorded during the execution of a program. The tabular visualization is more comprehensive than a graphical visualization, but easier to read than viewing a log file in a text editor or other text-based viewer.

Figure 6A:
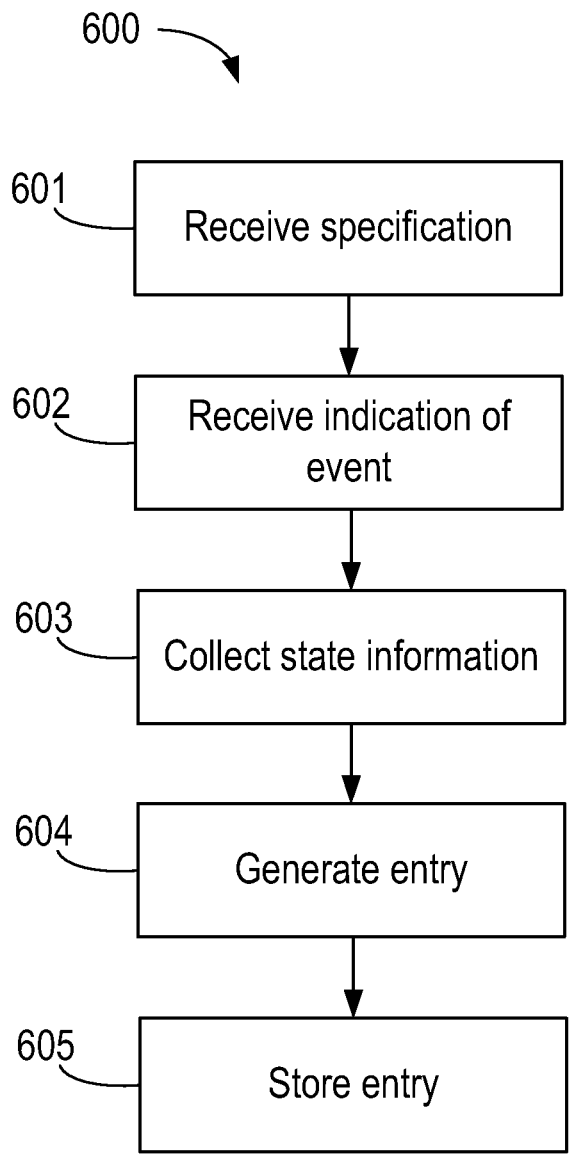
FIGS. 6A and 6B show flowcharts.

FIG. 6A shows a flowchart for a process 600. For example, the process 600 could be performed by the computer system 104 shown in FIG. 1A, e.g., while a computer program is executing on the computer system.

A specification defining types of state information is received 601. For example, the specification can include tags identifying types of state information, as shown in FIGS. 3A-3C.

Among other things, the specification can define a) an identification of an instance of an object from which the function was executed, b) an identification of the function, c) an identification of a time at which the function was called d) arguments passed to the function and defines variables associated with the function e) an identification of variables passed to the function f) output of the function, g) another function that called the function, or other types of information. When we say that the specification defines this information, we mean that the specification includes information that can be used to identify each type of information in a log entry.

In some examples, the format of the specification is a format that is compatible with a facility that generates a visualization of execution of at least one of the computer programs (e.g., a program that generates a visualization such as the visualization 108 shown in FIG. 1A). For example, the visualization facility can use the specification to parse a log formatted according to the specification, and generate a specification from the parsed information.

An indication that an event associated with at least one of the computer programs has occurred is received 602. The event is associated with execution of a function of the computer program. For example, the event could be a call to a function within the computer program.

State information describing the state of the execution of the computer program when the event occurred is collected 603. For example, the state information can indicate the current state of the computer program or the current state of the computer system or could be other types of state information.

An entry corresponding to the event is generated 604. The entry includes elements of the collected state information, and the elements of state information are formatted according to the specification.

The entry can be recorded based on a log level and a detail level. For example, different types of events are logged when different levels of logging are specified. If the entry does not match the log level, then the entry is not recorded. Further, for the same type of event, different amounts of information are logged when different levels of details of logging are specified. The detail level determines how much information is included when the entry is generated. In some examples, the log level or detail level or both can be dynamically adjusted during execution of computer programs. For example, the computer program may allow a user to set a log level 530

(FIG. 5A) using user interface controls. The user may set different log levels for different segments (or layers) of the computer program. By dynamically adjusting, we mean that when the computer program is executed, the level of logging is automatically adjusted depending on, e.g., which function is executing or what type of object the function executes from.

In some examples, the log level or detail level or both are associated with a class defining an object type to which the function belongs. Objects in object-oriented programs are generally defined according to a class, such that every object is an instance of a class. For example, when an entry is generated, the log level and/or detail level associated with an object are used to determine the log level and/or detail level to use for any entry generated in response to an event associated with the object (e.g., an event such as a function call).

The entry is stored 605. The entry can be stored in a log file, or another kind of a log, such as a database of log entries. For example, the log file could be the annotated log file 106 shown in FIG. 1A.

Figure 6B:
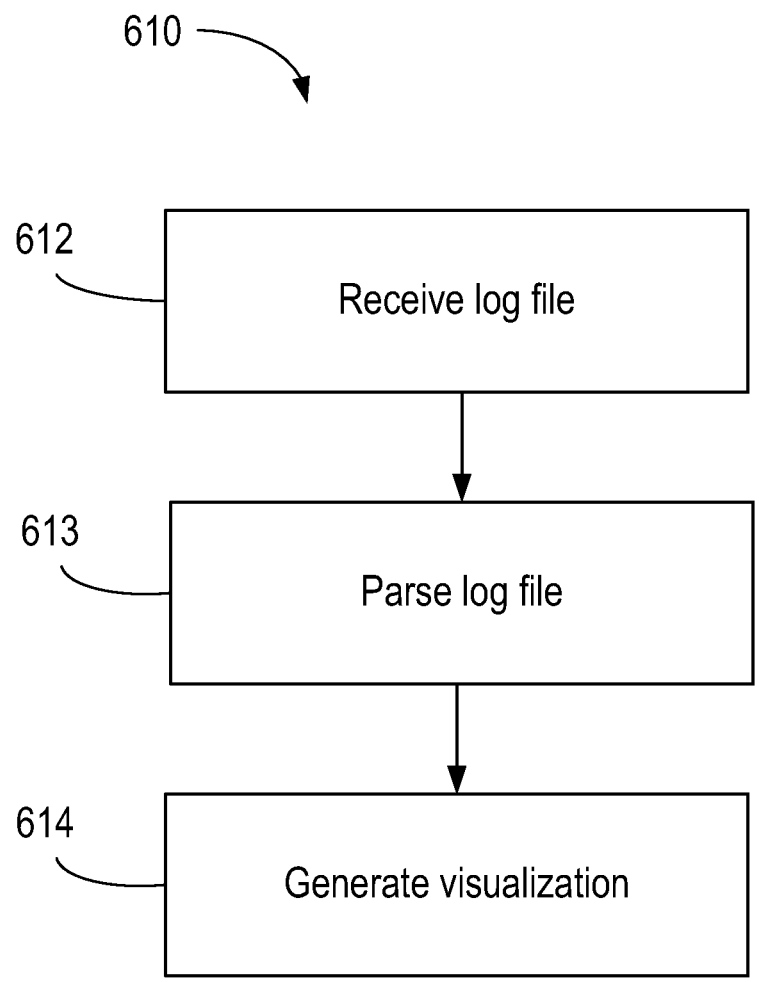

FIG. 6B shows a flowchart for a process 610. For example, the process 610 could be performed by the computer system 100 shown in FIG. 1A.

A log is received 612 that includes entries generated based on events that occurred during an execution of one or more computer programs on a second computer system. The log can be received from the second computer system, and the entries include state information of the computer program describing a state of execution of at least one of the computer programs at the time at which the respective event occurred. At least some of the entries can be associated with execution of a call to a function of at least one of the computer programs.

The log is parsed 613 to extract information representative of the execution of at least one of the computer programs over a period of time. The tagged state information can be interpreted based on a specification defining the tags.

A visualization of the execution of the computer program is generated 614 based on the log. In some implementations, the process 600 includes displaying the visualization in a user interface.

In some examples, the visualization includes a graphical representation of functions of the computer program. The graphical representation of the functions can include a graphical representation of time of execution of the functions, for example, bars having a length representing the time of execution. At least some of the graphical representations may include interactive functionality determined based on the entries of the log file.

In some examples, the visualization includes a tabular representation of state information of the computer program. In some examples, the log file includes fields having a format defined according to an XML specification, for example, an XML specification defining tags corresponding to state information of computer programs.

In some examples, the graphical representation includes a span representing a plurality of functions executed in association with one another, e.g., each of the plurality of the functions was called by another of the plurality of the functions during the execution of the computer program.

In some examples, the visualization shows a plurality of layers and relationships among events that occur at the plurality of layers during execution of the computer program. For example, the layers can include a layer representing user interactions, and the visualization shows relationships among user interactions and other events (e.g., client-server events). For example, functions executing in a user interface layer (e.g., functions responding to a user interface event such as a button pressed in the user interface) may cause functions to execute in a client-server layer (e.g., functions that, in response to the button press, initiate network communications between a client and a server).

The techniques for recording program execution described above can be implemented using software for execution on a computer, e.g., the computer system 100 or the computer system 104 shown in FIG. 1A. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules or components or layers of a larger program, for example, a program that provides services related to the design and configuration of computation graphs. The nodes and elements of the graph can be implemented as data structures stored in a computer readable medium or other organized data conforming to a data model stored in a data repository.

The software may be provided on a storage device or medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

Figure 7:
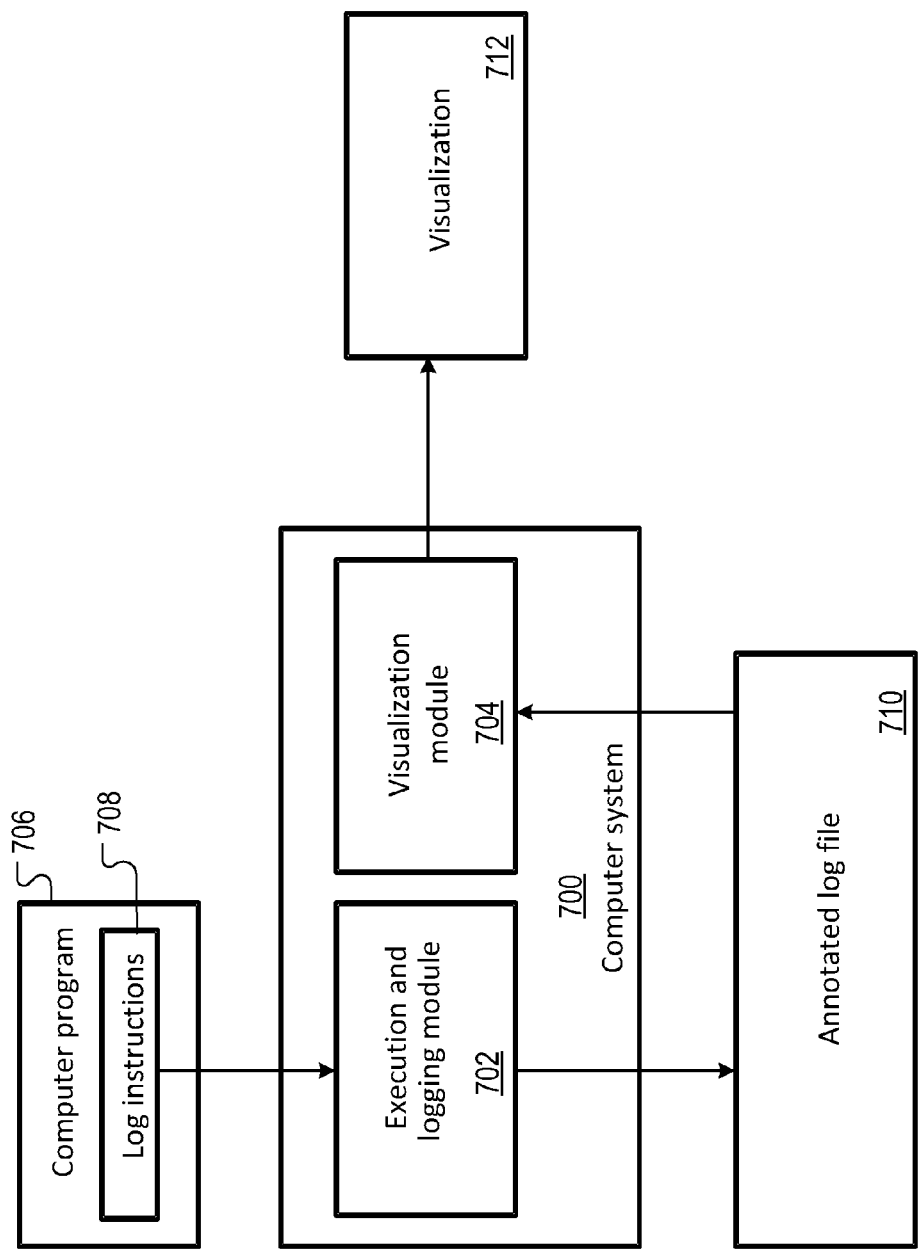
FIG. 7 shows a block diagram of a computer system and related components.

A number of embodiments of the invention have been described. Nevertheless, it will be understood that various modifications may be made without departing from the spirit and scope of the invention. For example, some of the steps described above may be order independent, and thus can be performed in an order different from that described. For example, a computer that generates a log file can also be used to display a visualization of the log file or a visualization of the execution of the computer program. For example, computers 100 and 104 can be the same computer. As shown in FIG. 7, a computer system 700 includes an execution and logging module 702 as well as a visualization module 704. The execution and logging module 702 receives a computer program 706 (e.g., a program compiled from program code) that includes log instructions 708 which cause data to be written to a log file while the functions of the computer program 706 are executing. The execution and logging module 702 outputs an annotated log file 710 based on the execution of the computer program 706. The annotated log file 710 can be provided to the visualization module 704, which displays a visualization 712 on the computer system 700 (e.g., displays the visualization to a user of the computer system on an output device such as a computer monitor). In this way, a visualization of a computer program can be displayed on the same computer system on which the program is executing.

The visualization can be displayed in real time. For example, as soon as log entries appear in the annotated log file 710, the visualization 712 can be updated on the output device of the computer system 700.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A computer-implemented method including:
   at a first computer system:
   receiving a log including entries generated based on events that occurred during execution of one or more computer programs on a second computer system, the one or more computer programs including a first computer program, the events including a first event, the entries including a first entry, the first entry including first state information describing a state of execution of at least the first computer program at a time at which the first event occurred; and
   based on information in the log, generating a visualization of execution of at least the first computer program, the visualization including at least one graphic representing a passage of time associated with execution of at least a portion of at least the first computer program, wherein:
   a first portion of the entries comprise data formatted according to a native format of a logging mechanism used when generating the log, and
   a second portion of the entries comprise data formatted according to a specification and in a format other than the native format of the logging mechanism, the data including first and second elements of the first state information, each of the first and second elements of the first state information being tagged with respective first and second tags defined by the specification.

2. The method of claim 1, wherein at least some of the entries are associated with execution of a call to a function of the first computer program.

3. The method of claim 1, further comprising generating the log at the second computer system and providing the log from the second computer system to the first computer system.

4. The method of claim 1, further comprising displaying the visualization.

5. The method of claim 1, wherein generating the visualization comprises generating an interactive visualization that provides a user with additional information about execution of the first computer program in response to user input.

6. The method of claim 1, wherein the visualization includes a visualization of a span of functions of the first computer program.

7. The method of claim 6, wherein the span of functions is marked in the first computer program.

8. The method of claim 1, wherein the visualization includes a tabular representation of the first state information.

9. The method of claim 1, wherein the specification comprises an XML schema, and wherein the second portion of the data is formatted in an XML format according to the XML schema.

10. The method of claim 9, wherein the XML schema defines tags for tagging elements of the first state information the tags including the first tag and the second tag.

11. The method of claim 1, wherein the visualization includes a plurality of layers, each of the plurality of layers being associated with one or more functions of at least the first of the one or more computer programs.

12. The method of claim 11, wherein the plurality of layers includes a user interface layer and the visualization includes execution time of one or more functions associated with a user interface of the first computer program.

13. The method of claim 11, wherein for each one layer in the plurality of layers the visualization includes execution time of one or more functions associated with the each one layer.

14. The method of claim 1, wherein the visualization includes a replay of the portion of the first computer program, the replay showing which functions were called, values that were passed to the functions that were called, and inputs provided by users during the execution of the first computer program.

15. The method of claim 3, wherein generating the log at the second computer system includes:
   receiving the specification, the specification defining types of state information; receiving an indication that the first event has occurred during execution of a first function of the first computer program;
   collecting the first state information;
   generating the first entry corresponding to the first event, the first entry including the first and second elements of the first state information, the first and second elements being formatted according to the specification; and
   storing the first entry in the log.

16. The method of claim 15, wherein the first state information includes information identifying an instance of an object from which the first function was called.

17. The method of claim 15, wherein the first state information includes information about objects instantiated in the first function.

18. The method of claim 15, wherein the first state information includes one or more arguments passed to the first function and values of one or more variables associated with the first function.

19. The method of claim 15, wherein the first state information includes values of one or more variables output by the first function.

20. The method of claim 15, wherein the specification specifies tags for the types of state information, the tags including the first and second tags.

21. The method of claim 15, further comprising dynamically adjusting a level of logging detail during execution of the first computer program.

22. The method of claim 21, wherein for a same type of event, different amounts of information are logged when different levels of logging detail are specified.

23. The method of claim 15, further comprising:
   receiving a level of logging detail indicating how much information is to be recorded in each entry of the log; and
   generating entries for events at the level of logging detail when the first function is executing.

24. The method of claim 5, wherein the interactive visualization provides the user with the first state information in response to the user input.

25. The method of claim 24, wherein the user input comprises the user hovering a cursor over a portion of the interactive visualization.

26. The method of claim 1, wherein the first entry includes first data formatted according to the native format of the logging mechanism used when generating the log, and second data formatted according to the specification and in the format other than the native format of the logging mechanism, the second data including the first and second elements of the first state information.

27. A non-transitory computer-readable storage device storing instructions that, when executed by a first computer system, cause the first computer system to perform:
    receiving a log including entries generated based on events that occurred during execution of one or more computer programs on a second computer system, the one or more computer programs including a first computer program, the events including a first event, the entries including a first entry, the first entry including first state information describing a state of execution of at least the first computer program at a time at which the first event occurred; and
    based on information in the log, generating a visualization of execution of at least the first computer program, the visualization including at least one graphic representing a passage of time associated with execution of at least a portion of at least the first computer program,
    wherein:
        a first portion of the entries comprise data formatted according to a native format of a logging mechanism used when generating the log, and
        a second portion of the entries comprise data formatted according to a specification and in a format other than the native format of the logging mechanism, the data including first and second elements of the first state information, each of the first and second elements of the first state information being tagged with respective first and second tags defined by the specification.

28. A first computer system having memory storing executable instructions, the first computer system configured by the executable instructions to perform:
    receiving a log including entries generated based on events that occurred during execution of one or more computer programs on a second computer system, the one or more computer programs including a first computer program, the events including a first event, the entries including a first entry, the first entry including first state information describing a state of execution of at least the first computer program at a time at which the first event occurred; and
    based on information in the log, generating a visualization of execution of at least the first computer program, the visualization including at least one graphic representing a passage of time associated with execution of at least a portion of at least the first computer program,
    wherein:
        a first portion of the entries comprise data formatted according to a native format of a logging mechanism used when generating the log, and
        a second portion of the entries comprise data formatted according to a specification and in a format other than the native format of the logging mechanism, the data including first and second elements of the first state information, each of the first and second elements of the first state information being tagged with respective first and second tags defined by the specification.

29. A first computer system including:
    means for receiving a log including entries generated based on events that occurred during execution of one or more computer programs on a second computer system, the one or more computer programs including a first computer program, the events including a first event, the entries including a first entry, the first entry including first state information describing a state of execution of at least the first computer program at a time at which the first event occurred; and
    means for, based on information in the log, generating a visualization of execution of at least the first computer program, the visualization including at least one graphic representing a passage of time associated with execution of at least a portion of at least the first computer program,
    wherein:
        a first portion of the entries comprise data formatted according to a native format of a logging mechanism used when generating the log, and
        a second portion of the entries comprise data formatted according to a specification and in a format other than the native format of the logging mechanism, the data including first and second elements of the first state information, each of the first and second elements of the first state information being tagged with respective first and second tags defined by the specification.

* * * * *